US005572705A

United States Patent [19]

Carson

[11] Patent Number: 5,572,705
[45] Date of Patent: Nov. 5, 1996

[54] SYNCHRONOUS PHASE TRACKING PARALLEL ELECTRONIC TIMING GENERATOR

[75] Inventor: Daryl Carson, Plymouth, Mich.

[73] Assignee: CAE, Inc., Hamburg, Mich.

[21] Appl. No.: 180,848

[22] Filed: Jan. 12, 1994

Related U.S. Application Data

[63] Continuation of Ser. No. 780,805, Oct. 22, 1991, abandoned.

[51] Int. Cl.[6] .......... G06F 12/02

[52] U.S. Cl. .......... 395/494; 395/421.07; 364/DIG. 1

[58] Field of Search .......... 364/200 MS File, 364/900 MS File; 395/400 MS File, 425 MS File, 421.07, 494

[56] References Cited

U.S. PATENT DOCUMENTS

| | | | |
|---|---|---|---|
| 3,448,338 | 6/1969 | Bentham et al. | 315/295 |
| 3,579,030 | 5/1971 | Bentham et al. | 315/291 |
| 3,898,643 | 8/1975 | Ettlinger | 340/324 |
| 3,987,359 | 10/1976 | Thompson | 323/101 |
| 4,047,097 | 9/1977 | Gyugyi et al. | 323/119 |
| 4,241,295 | 12/1980 | Williams, Jr. | 315/294 |
| 4,281,412 | 7/1981 | Wissel et al. | 375/86 |
| 4,287,468 | 9/1981 | Sherman | 323/322 |
| 4,511,824 | 4/1985 | Goddard | 315/297 |
| 4,858,178 | 8/1989 | Breuninger | 364/900 |
| 4,903,022 | 2/1990 | Hester et al. | 341/110 |
| 4,959,793 | 9/1990 | Suzuki | 354/900 |
| 4,985,848 | 1/1991 | Pfeiffer et al. | 364/518 |
| 5,038,143 | 8/1991 | Hester | 341/110 |
| 5,058,041 | 10/1991 | Rose et al. | 364/521 |
| 5,163,123 | 11/1992 | Kadono | 395/116 |

*Primary Examiner*—Reba I. Elmore
*Attorney, Agent, or Firm*—James M. Deimen

[57] ABSTRACT

An electronic timing generator with a plurality of outputs being defined by a particular relationship with the phase angle of a periodic input signal. Each period of the input signal is divided into a plurality of "time slices" uniquely identified by a numerical value. Each time slice number is applied as a context or address to a storage circuit and the corresponding data retrieved from the storage circuit is used to produce the corresponding output signals through a latching circuit. Each context may have associated with it one retrieval step or several retrieval steps. The storage circuit permits the entry of an image input from a second input source that may be a sophisticated programmable computer or simply a plurality of manually operable switches. Or the second source may be merely an image permanently stored in the memory. The electronic timing generator has particular application to a wide variety of devices including stage lighting systems, internal combustion engines, electric power generators and other cyclic systems wherein external factors affect the desired output and the real time moment by moment exhaust of pollutants and contaminants.

21 Claims, 8 Drawing Sheets

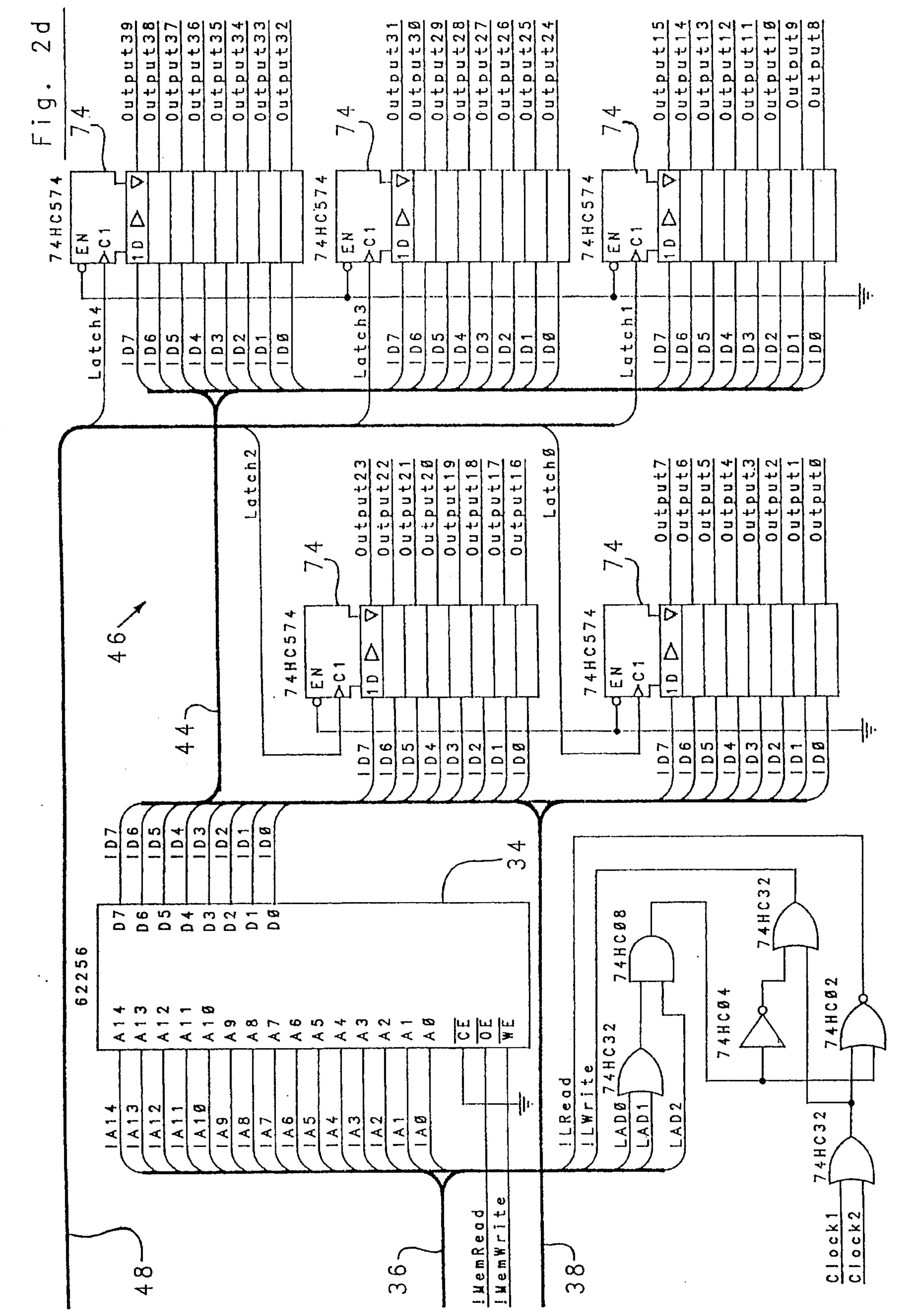
Fig. 2d
74HC574
EN
C1
1D
74
Latch4
Latch3
Latch2
Latch1
Latch0
ID7
ID6
ID5
ID4
ID3
ID2
ID1
ID0
Output39
Output38
Output37
Output36
Output35
Output34
Output33
Output32
Output31
Output30
Output29
Output28
Output27
Output26
Output25
Output24
Output23
Output22
Output21
Output20
Output19
Output18
Output17
Output16
Output15
Output14
Output13
Output12
Output11
Output10
Output9
Output8
Output7
Output6
Output5
Output4
Output3
Output2
Output1
Output0
46
44
34
62256
D7
D6
D5
D4
D3
D2
D1
D0
A14
A13
A12
A11
A10
A9
A8
A7
A6
A5
A4
A3
A2
A1
A0
CE
OE
WE
IA14
IA13
IA12
IA11
IA10
IA9
IA8
IA7
IA6
IA5
IA4
IA3
IA2
IA1
IA0
!LRead
!LWrite
LAD0
LAD1
LAD2
74HC32
74HC08
74HC04
74HC02
Clock1
Clock2
!MemRead
!MemWrite
48
36
38

16
18
Generator Address
48
Latch0
Latch1
Latch2
Latch3
Latch4
Latch5
Latch6
Latch7
62
74HC138
TSB7
TSB6
TSB5
TSB4
TSB3
TSB2
TSB1
TSB0
LAD2
LAD1
LAD0
ILTime
74HC4040
54'
.1uF
4066
74HC04
74HC32
74HC08
120K
180K
12K
14
4046
50
Synthesized Fin
VCO
PC10
R2
R1
C1-
C1+
CIN
SIN
INH
2.2nF
Sync
10
74HC74
Clock4
30
Clock1

SYNCHRONOUS PHASE TRACKING PARALLEL ELECTRONIC TIMING GENERATOR

This is a continuation of application Ser. No. 07/780,805, filed on Oct. 22, 1991, abandoned.

BACKGROUND OF THE INVENTION

The field of the invention pertains to the electronic timing of a plurality of events in a cyclic system and, in particular, to the creation of a plurality of timing signals synchronous with an external reciprocating signal.

U.S. Pat. No. 4,241,295 discloses a digital lighting control system comprising, in particular, a computer, direct memory access means and a trigger pulse generator. In the trigger pulse generator is a comparator which accepts data from an internal memory and a sequential address counter. The comparator will only output a signal to the decoder and in turn to the power circuit for the lamps when both the memory signal and the counter signal are equal.

U.S. Pat. No. 3,448,338 discloses a stage lighting system comprising a memory store in digital form for dimmer settings corresponding to particular stage lighting cues for stage lighting effects. Control means are included for selectively modifying the dimmer signals as desired and a master fader control subject to the modified dimmer signals stored in memory.

U.S. Pat. No. 3,579,030 discloses further improvements to the lighting system disclosed in the above patent. Specifically, backing memory storage elements for the "active" memory elements are disclosed along with circuitry for recording and retrieving data in the backup storage.

U.S. Pat. No. 3,898,643 discloses a stage lighting system having a data processor central to a plurality input peripherals and an output interface to the dimmers for the lighting banks.

U.S. Pat. No. 4,287,468 discloses the control of power dissipation in a stage lighting system by eliminating selected half cycles applied to the load. The device relies upon zero crossing switching.

U.S. Pat. No. 4,511,824 discloses an electronic lamp dimmer employing a parallel access memory with simultaneous access to a large number of presets but avoids application of a heavy workload on a serial processor.

SUMMARY OF THE INVENTION

The invention creates a plurality of output timing signals synchronous with an external reciprocating signal. The external reciprocating signal may be supplied from a common power source such as a 50–60 Hz power line or an electric pickup from a rotating flywheel on an engine, for example. A myriad of mechanical or electrical rotating sources of the external signal might be envisioned.

The output signals are defined by a relationship with the particular phase (angle) of the external signal. Thus, the timing of a particular output signal is proportioned to the period of the external signal.

The invention comprises a device for dividing each period of the external signal into a certain number of time slices which are delineated by generated pulses. A phase-locked-loop frequency multiplier or a rotational encoder may be used to provide the pulses.

The pulses in turn drive an address generator or counting circuit which produces a unique number for each time slice of the external signal. Periodically the counting circuit is reset with the external signal to maintain coherence with the external signal although with a phase-locked-loop frequency multiplier reset may not be necessary.

Each number produced by the counting circuit is applied as a context or address to a storage circuit and the corresponding data retrieved from the storage circuit is used to produce the corresponding output signals. Each context may have associated with it one retrieval step (parallel) or several retrieval steps (serial). The storage circuit may also be supplied with the generated pulses and/or an image input. The image input may be supplied from an outside source such as a computer generated signal in response to some external variable or the image may be permanently stored in memory. Thus, a phase-coherent picture of the input with reference to the external signal is produced.

Although originally developed as sophisticated stage lighting control, the invention has much wider applicability. For example, the combination of a periodic or reciprocating input signal and a storage memory with a fixed or a modifiable image input in real time provides application to internal combustion engines where the spark timing, fuel injection timing and valve timing can be controlled in real time to adjust for environmental changes and real time changes in desired output. For example, almost instantaneous adjustment can be made for changes in load demand on electrical generating sets thus minimizing fuel consumption and exhaust pollutants while retaining constant rotational speed. In motor vehicles such real time adjustments over the speed and power range to maximize fuel economy without compromising driveability and exhaust pollution control can be accomplished by an image input real time adjusted for the current operating environment (air temperature, engine temperature, fuel octane, etc.) and the condition of the emission control system (catalyst condition, air pump output, etc.). In summary, an input image to storage as sophisticated as necessary can be applied through a combination of sensors and micro-processor.

DESCRIPTION OF THE DRAWINGS

FIGS. 2*a* through 2*e* are a circuit for the generator utilizing a plurality of integrated circuits;

DESCRIPTION OF THE PREFERRED EMBODIMENT

Figure 1:
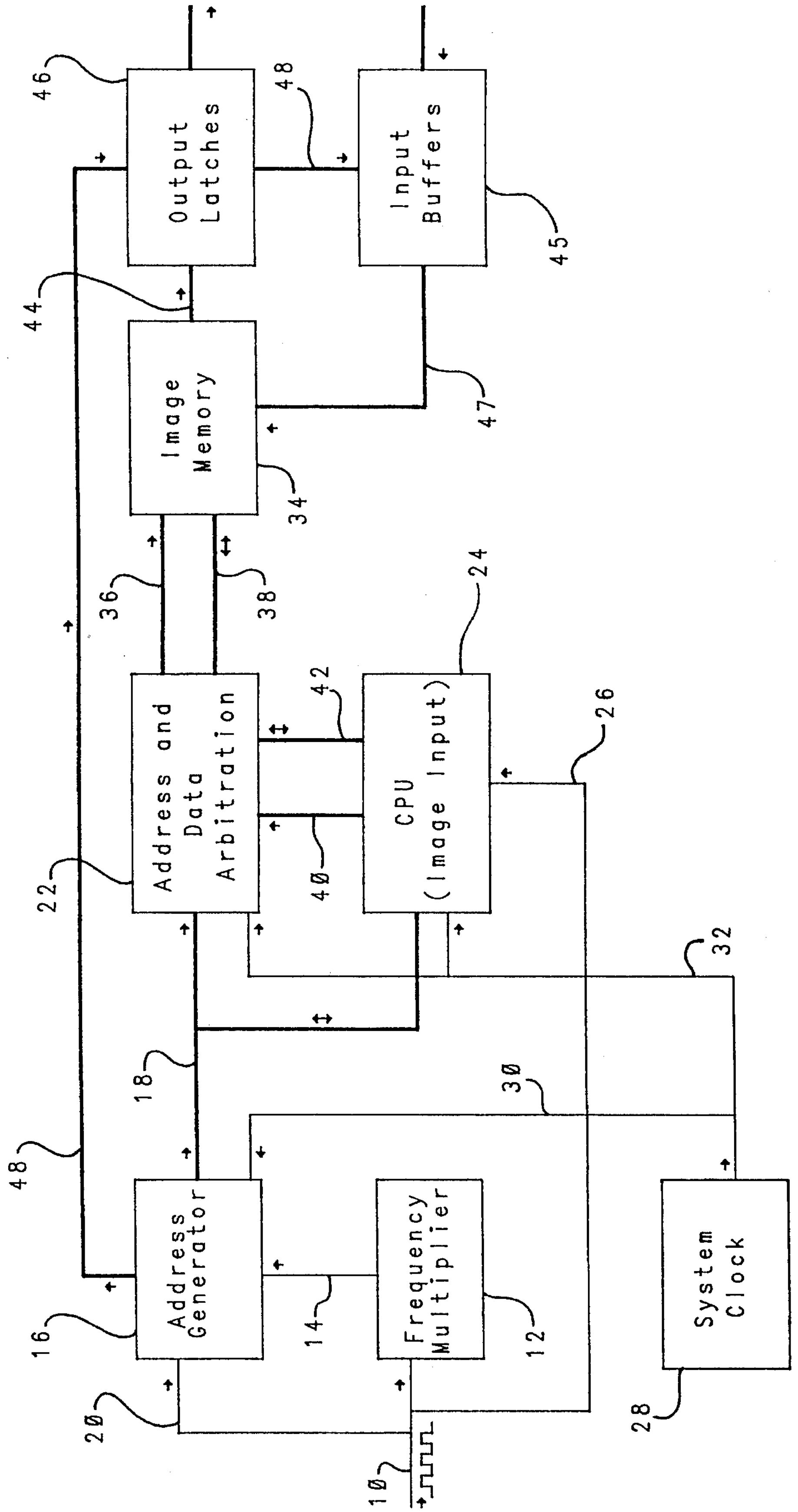
FIG. 1 is a block diagram of the synchronous phase tracking parallel electronic timing generator.

Illustrated in FIG. 1 is an external reciprocating signal 10 driving a frequency multiplier 12 which may be a phase-locked-loop frequency multiplier or a rotational encoder or some combination of both. The output pulses 14 divide up one or more periods or cycles of the reciprocating signal into time slices and are input to an address generator or counting circuit 16 which in turn produces a unique number or address for each time slice pulse 14 within a period of the reciprocating signal. In effect the unique numbers or addresses provide a unique identification number for each time slice of the external signal 10 and comprise the output 18 of the counting circuit address generator 16.

To maintain coherence between the external signal 10 and the time slice numbers 18 (counting circuit output) a reset 20 from the external signal 10 to the counting circuit 16 is provided although with a phase-locked-loop frequency multiplier the reset may be deleted. The time slice numbers 18 are provided to an address and data arbitration circuit 22 and a central processing unit (CPU) 24. The CPU is provided at 26 with the external reciprocating signal or external sync 10. A system clock 28 is directly connected by 30 to the address generator 16 and by 32 to the CPU 24 and the address and data arbitration circuit 22.

The address and data arbitration circuit 22 provides alternating communication by the CPU 24 and the address generator 16 to the image memory 34 through the address bus 36 and data bus 38. The CPU 24 communicates with the address and data arbitration circuit 22 with a CPU address bus 40 and CPU data bus 42. The address and data arbitration is used when the image memory 34 is alterable and the CPU 24 is used to alter the image memory. The image memory 34 is a storage device used to hold and produce the words of the output image when accessed.

The image memory data or output image is supplied through the bus 44 to the output latches 46. For each of the accesses to image memory 34 the appropriate output latch must be clocked. This is provided from the address generator 16 directly 48 to the output latches 46. The output latches 46 provide the plurality of signals to control devices or servos as desired such as a plurality of silicon controlled rectifiers in stage lamp circuits or the fuel injectors and valves in an internal combustion engine.

Figure 2A:
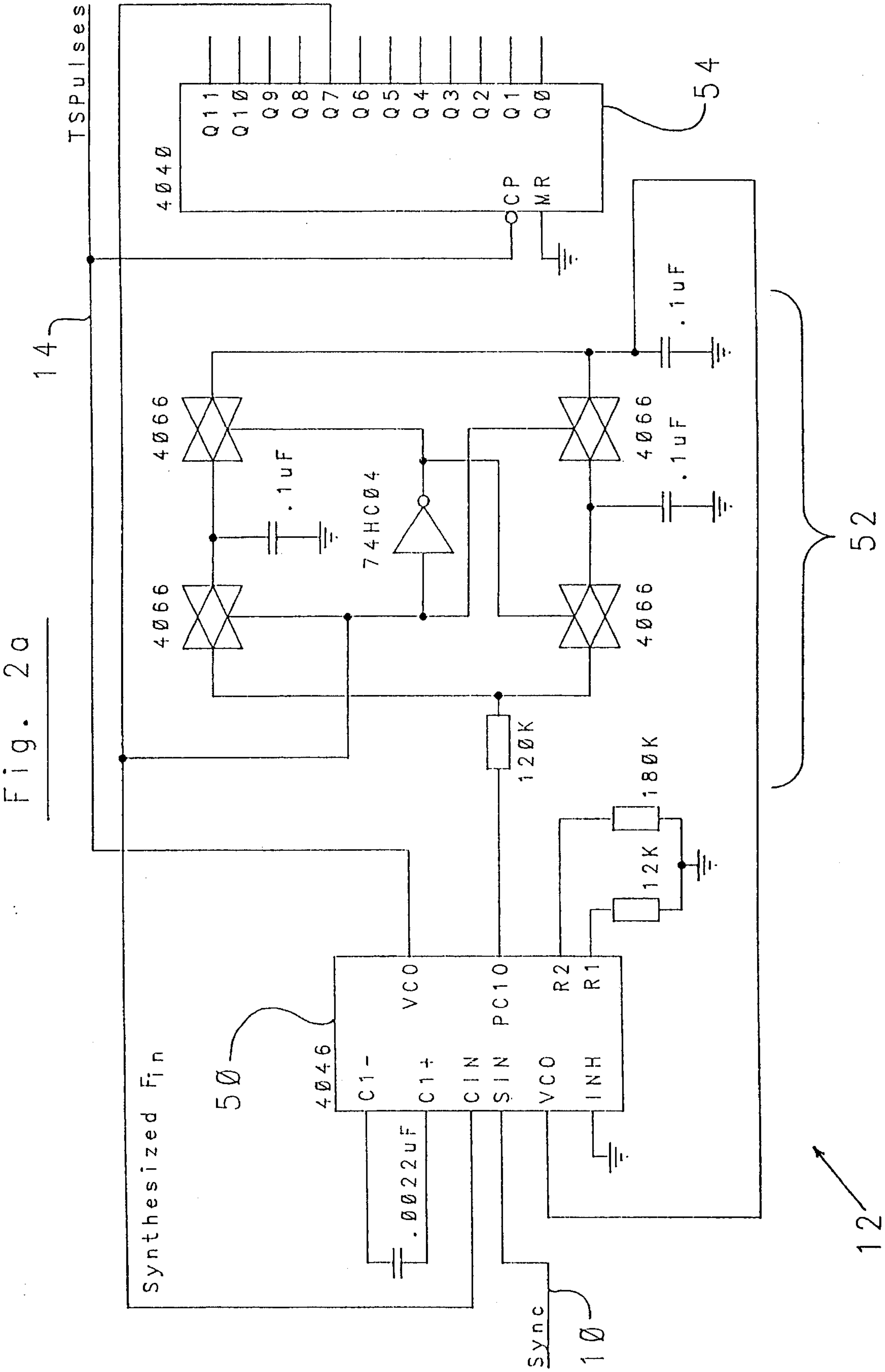

Illustrated in FIGS. 2*a* through 2*e* is an example of a synchronous parallel electronic timing generator in detail, however, this example is illustrative only and many other embodiments can be envisioned depending upon the particular device which is to be controlled. This particular embodiment is directed to the control of banks of stage lighting. In FIG. 2*a* the frequency multiplier 12 is illustrated and comprises a phase locked loop chip 50 (4046). Unless otherwise indicated, industry standard numbers are used for integrated circuit chips. Due to the high multiplication ratio, the exclusive - OR is being used. The phase shift varies from a nominal 90 degrees at center frequency to 0 and 180 degrees at each limit of the frequency range. In this example the external sync 10 may range from about 40 $H_z$ to 70 $H_z$.

The synchronous parallel electronic timing generator is sensitive to changes in the voltage controlled oscillator (VCO) output 14 (time slices), as each time slice is used to mark a precise location within the cycle of the external sync 10. Absent means to stabilize the VCO within a cycle or half cycle of the external sync 10 a varying frequency would be produced, therefore to ensure the linearity of the time slices, the phase locked loop chip 50 is integrated into a switched capacitor filter generally denoted by 52.

The N-Divider 54 (4040) determines the numerical multiplier applied to the incoming external sync 10. For simplification N is selected as a power of 2 and in this application N=256 per cycle. In this example, the N-Divider 54 divides the VCO frequency before sending the VCO frequency to the phase locked loop 50 so that the VCO divided by N is equal to the input signal.

Figure 2B:
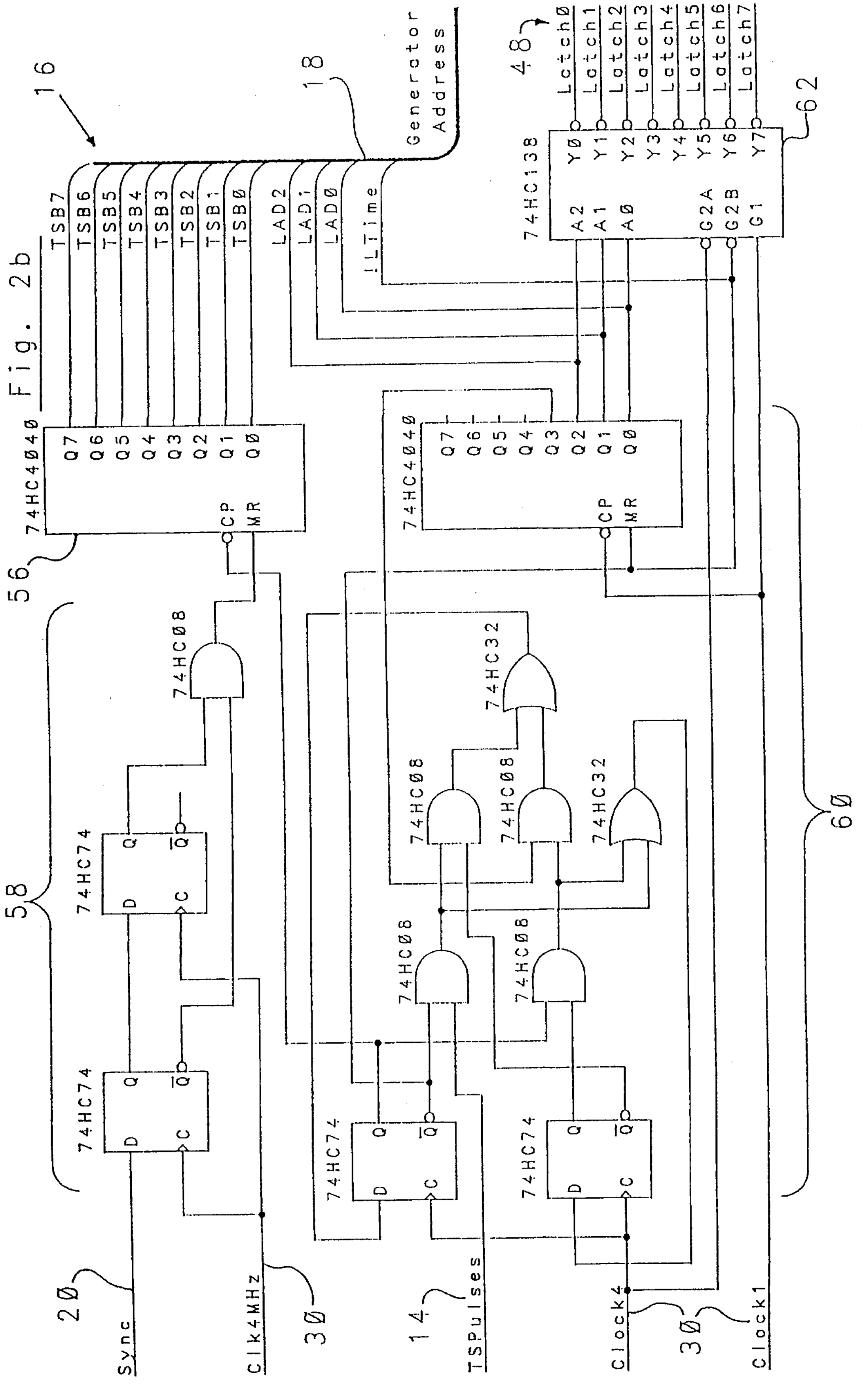

The address generator 16 shown in FIG. 2*b* creates the number ,corresponding to each time slice. This time slice number ranges from 0 to N−1. The time slice numbers create the primary addresses applied to the image memory 34. If the number of output signals necessary is more than the width of the image memory, then multiple accesses to the image memory, FIG. 2*d*, are made for each time slice. In the example, forty output signals are desired, therefore five accesses are made for each time slice and lines are added to the address to enumerate each of these successive accesses.

The image memory 34 in this example may contain more than one image and the CPU 24 may be updating an image while the generator is outputting a previous image. Or the image memory may be permanent and the generator switched from one image to another as external conditions change. In either case, another set of lines is added to the address generated and are part of the address for each access. In this example, these are termed bank address lines and are set by the CPU 24 through its input/output facilities.

Returning to FIG. 2*b*, the time slice number is generated by the binary counter 56 (74HC4040). The counter is timed by the time slice pulses, timed so as to prevent counter bit transition during access to the image memory. The counter 56 is edge reset to zero every period of the external sync 10 to keep the counter in step with the external sync. The edge reset 58 comprises a dual flip-flop (74HC74) and an AND gate.

For each of the multiple accesses to image memory, the appropriate output latch 46 is clocked. The latch sequencer 60 (74HC74, 74HC08, 74HC4040, 74HC32) generates address lines for a portion of the address that quickly signals or clocks the output latches 46 at the beginning of each time slice. In this example, the latch sequencer 60 is decoded from three lines to five lines by a three line to eight line decoder 62 (74HC138). As soon as all of the latches are updated, the time slice counter 56 is incremented.

Figure 2C:
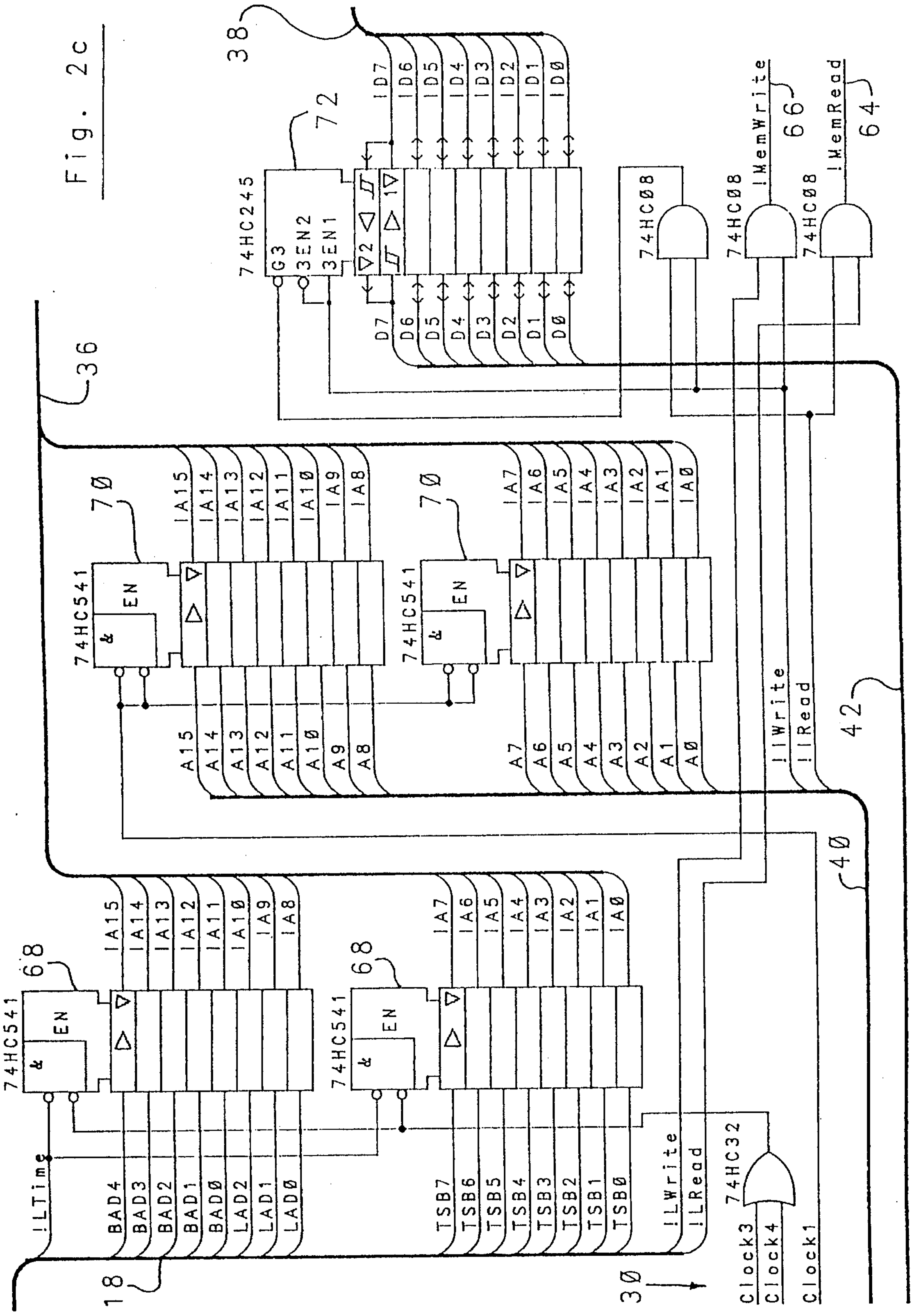
Figure 2E:
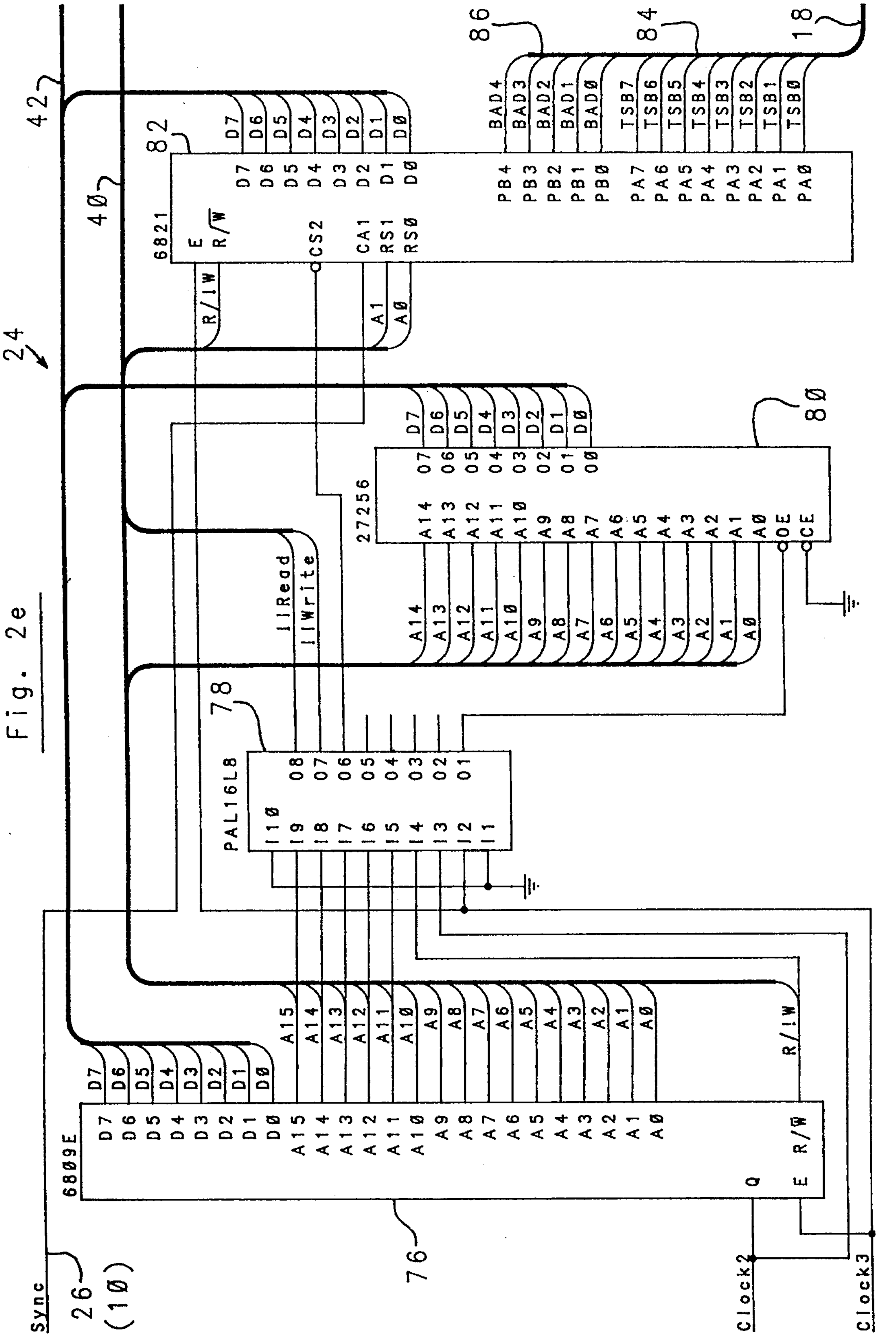

Shown in FIG. 2*c* is the arbitration circuit 22 for access to the image memory 34 by both the address generator 16 and the CPU 24. Arbitration is used where the image memory is alterable and a CPU is used to create the alterations in memory. In this example, the arbitration timing is accomplished by a synchronous CPU 24 run on an interleaved clock with the address generator 16. The image memory is supplied with an address 36, data 38 and lines which indicate reading from 64 and writing to 66 the image memory 34. The memory 34 is read when the address generator 16 or CPU 24 issues a request.

The address supplied by the address generator 16 is applied via 3-state buffers 68 (74HC541). The buffer outputs are only active when the address generator 16 is to access the image memory 34 for latching in the output latches 46. This occurs only during that portion of the clock time associated with the address generator 16.

In like manner, the CPU 24 address is also supplied through 3-state buffers 70 (74HC541) but these have active outputs during the portion of the clock time associated with the CPU 24.

The CPU 24 is also coupled to the image memory data bus 38 by a bi-directional buffer 72 (74HC245). This buffer 72 is timed to prevent advanced write data from the CPU 24 from entering the image memory data bus 38 until the CPU 24 has access to the image memory 34. Thus, the buffer 72 is enabled during an image memory 34 read or write by the CPU 24.

Returning to FIG. 2*d*, the image memory 34 (SRAM) functions as a storage device to hold and produce the words of the output image when accessed. In some applications it may be a permanent memory, such as a read only memory (ROM). One or more whole images might be installed. When the image is to be dynamically altered by a CPU 24 or other device, then the memory may be a static random access memory (SRAM). In this example, the image memory 34 is a 32 K×8 static RAM (SRAM). The image memory address bus 36 is directly connected to the image memory and the arbitration circuit 22. The image memory data bus 38 is directly connected to the output latches 46 and the buffer 72.

The output latches 46 provide the output image from the memory to the outside world such as a plurality of silicon controlled rectifiers for stage lighting. In FIG. 2*d* five output latches 74 are shown. The output latches remain stable during each time slice. The five output latches 74 (74HC574) provide for 40 output signals for this particular example. However, this example circuit can readily accommodate from one to eight output latches and can be made to handle sixteen or more output latches. Thus, a large number of output signals can be provided by the multiple latches and multiple memory accesses per time slice.

The output latches 74 and therefore output images will change when data differing from the previous data is latched into the output latches. Therefore, the outputs only change on transitions between time slices. Since only one access is made each bus cycle, there is a finite difference in time between the updating of the first output latch and the last output latch for each bus cycle. This time difference, called "skew", is equal to the number of latches minus one, times the bus cycle time. This skew in the example is a few microseconds and is not normally a problem. If necessary to reduce skew, the bus cycle time may be reduced or latch output signals that are critical may be placed on the same latch.

For absolute "deskew", the outputs of all the latches, except for the last latch, can be put into another set of final output latches. Then the final output latches can be clocked at the same time as the last output latch, and all outputs will change at virtually the same instant. The CPU 24 is illustrated in detail in FIG. 2*e*. The CPU 24 comprises a processor 76 (6809E) for an external clock and, in this example, the bus on this system runs at 1.0 MHz. Also within the CPU 24 is an address decoding programmable logic device (PLD) 78 (PAL16L8) for generating select signals for memories and input/output devices. In this example, select lines are produced for reading and writing the image memory 34, the program memory 80 and input/output device 82.

The program memory 80 (27256) is a small erasable programmable read only memory (EPROM). Some input/output lines are provided by chip 82 (MC6821). More importantly, the connection 84 to the address generator bus 18 and external sync 10 of chip 82 allow the processor 76 to read the time slice numbers and adjust for the phase angle of the external sync. The second connection 86 to the address generator bus 18 comprises the bank address lines of the CPU 24. Additional input/output at 82 and device selects at 78 can be used. The actual input/output and address decoder of the CPU 24 depend upon the application of the synchronous parallel electronic timing generator.

The system clock 28 comprises an oscillator section and a phasing section. In this example the basic clock signal is 4 MHz and four additional clock signals are provided at 1 $MH_z$ in inverse pairs of differing phase. The oscillator section is a standard Pierce oscillator and buffer which supplies the 4 $MH_z$ signals to the generator and to the phasing section. In the phasing section the base clock frequency is converted into a 4-phase overlapping clock by a pair of D-type flip-flops.

Figure 3:
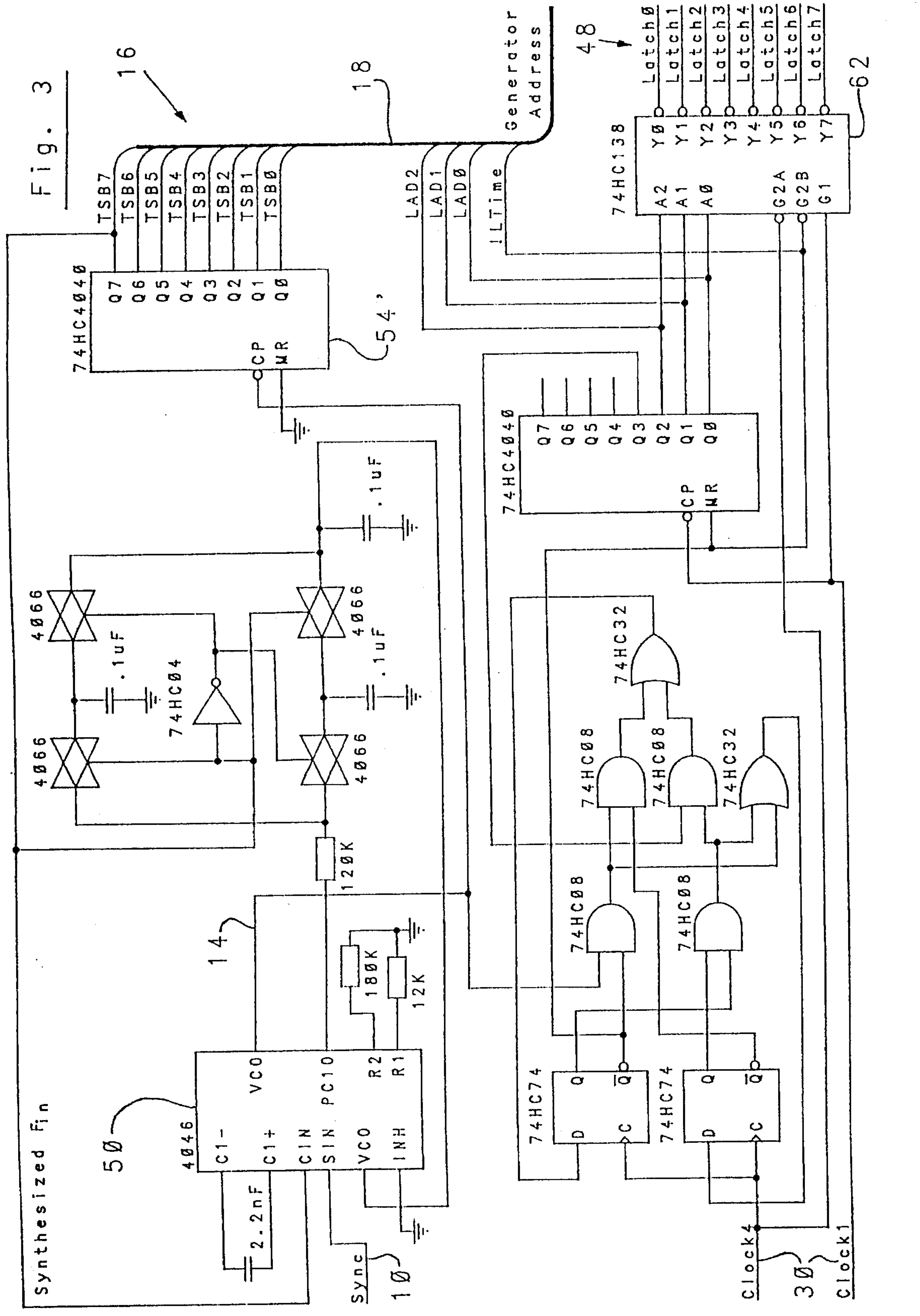
FIG. 3 is an alternative simplified frequency multiplier and address generator.

FIG. 3 illustrates an alternate combined frequency multiplier and address generator. In order to reduce circuit cost and size, the address generator 16 may be reduced by using the N-divider 54' of the frequency multiplier 12 to supply the time slice number to the generator address bus 18. This combination is inherently reset at exactly the period of the external signal or sync 10.

However, the count on this N-divider and time slice number counter 54' may not, and usually will not, match the time slice number relative to the external signal or sync 10. The phase shift characteristic of the phase locked loop 50 will offset the count from the N-divider counter 54'. Moreover, the phase difference will change over time and frequency.

To place images in the image memory 34 relative to the external sync 10 the CPU 24 reads the offset count on the N-divider counter 54' when the external sync makes an active transition. Thus, this example circuit provides for the CPU 24 to detect the external sync 10 transitions and to read the time slice number supplied by the address generator. The CPU 24 adds the offset to the required position to provide the proper address to store the image in the image memory 34.

Figure 4:
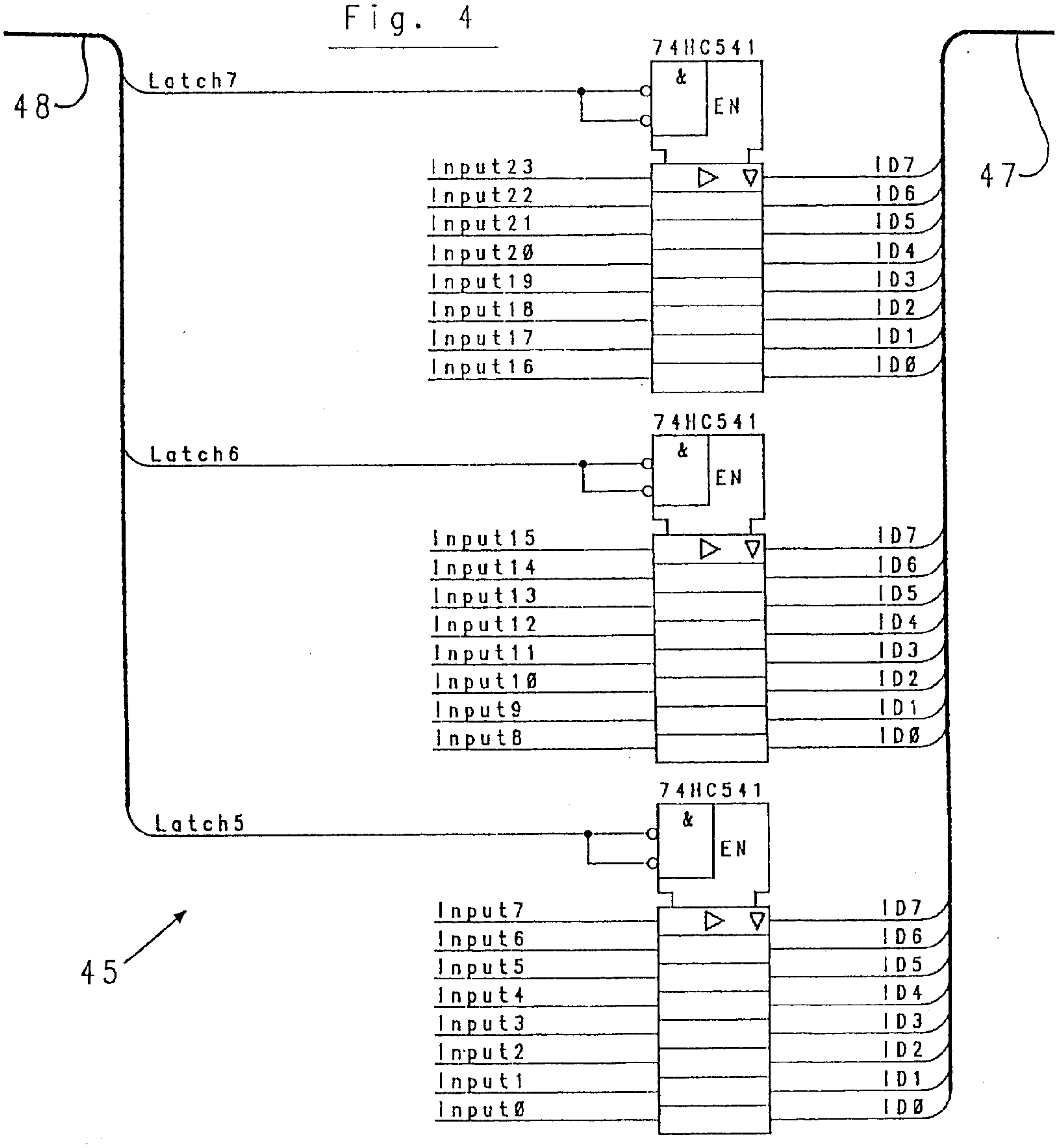
FIG. 4 is a circuit for an input latch or buffer.

FIG. 4 shows the addition of input buffers or latches as also indicated by block 45 in FIG. 1. The three buffers or latches 45 (74HC541) provide for up to 24 input signals which are then passed on to the image memory 34 through bus 47. The individual input signals repeat at the same frequency as the external sync 10 but may be at different phase and amplitude and are suited for comparative measurements to adjust the input image data. For example, changes in the input signals can be used to cause switching from the stored image in a ROM in the image memory 34 to another ROM in the image memory. Or, the phases of signals such as the phases in three phase AC power for a stage lighting system can be input to the three buffers.

I claim:

1. A synchronous parallel electronic timing generator comprising,

- means to generate a phase tracking multiple frequency from an external reciprocating signal, said multiple frequency being greater than the frequency of the external reciprocating signal and an equal multiple of each cycle of the external reciprocating signal,
- means to repeatedly count each cycle of the multiple frequency during a selected portion of the external reciprocating signal and means to generate a unique address number corresponding to each count thereby providing a stream of unique address numbers,
- a source of image data to output a stream of image data numbers,
- an image memory wherein the stream of image data numbers in response to the stream of unique address numbers provides a stream of imaged unique data numbers,
- means to generate a second set of address numbers initiated by the multiple frequency to allow at least one imaged unique data number to be multiply accessed from image memory during each cycle of the multiple frequency, and
- one or more output latches wherein the second set of address numbers set the output latches within each cycle of the multiple frequency and the imaged unique data numbers are imposed to form an imaged output from the output latches.

2. The synchronous parallel electronic timing generator of claim 1 including means to arbitrate between the stream of unique address numbers and the stream of image data numbers.

3. The synchronous parallel electronic timing generator of claim 2 wherein the source of image data comprises a central processing unit in communication with the means to generate a unique address number corresponding to each count and the means to arbitrate between the stream of unique address numbers and the stream of image data numbers.

4. The synchronous parallel electronic timing generator of claim 3 wherein the means to arbitrate interleaves the stream of unique address numbers and the stream of image data numbers to the image memory.

5. The synchronous parallel electronic timing generator of claim 3 wherein the means to generate a unique address number corresponding to each count repeatedly resets to the same phase angle of the external reciprocating signal.

6. The synchronous parallel electronic timing generator of claim 3 including means in the central processing unit to compensate for changes in the phase angle of the stream of unique address numbers relative to the external reciprocating signal.

7. The synchronous parallel electronic timing generator of claim 6 wherein the means to repeatedly count each cycle and the means to generate unique address numbers comprise an N-divider outputting a plurality of unique numbers for each selected period of the external reciprocating signal.

8. The synchronous parallel electronic timing generator of claim 3 including means in the central processing unit wherein image data numbers may be written into and read from the image memory by the central processing unit.

9. The synchronous parallel electronic timing generator of claim 1 wherein the generated multiple frequency is an integer multiple frequency of the phase variable external reciprocating signal.

10. The synchronous parallel electronic timing generator of claim 1 wherein the source of image data comprises a read only memory containing time invariant image data.

11. The synchronous parallel electronic timing generator of claim 1 wherein the source of image data comprises a random access memory, said random access memory alterable by a central processing unit.

12. The synchronous parallel electronic timing generator of claim 1 wherein the source of image data comprises a random access memory, said random access memory alterable by external input/output means.

13. The synchronous parallel electronic timing generator of claim 1 wherein the source of image data lies preprogrammed within the image memory.

14. The synchronous parallel electronic timing generator of claim 1 including multiple selectable sources of image data, one or more input buffers in communication with the image memory and means in the image memory in response to a change in input to the input buffers to cause a change in the source of image data.

15. The synchronous parallel electronic timing generator of claim 1 including means to repeatedly count a limited portion of at least one repeated cycle of the multiple frequency.

16. The synchronous parallel electronic timing generator of claim 1 including means to successively access the image unique data numbers to accommodate a lack of image memory width.

17. A synchronous parallel electronic timing generator comprising, means to generate a phase tracking multiple frequency from an external reciprocating signal, said multiple frequency being greater than the frequency of the external reciprocating signal and an equal multiple of each cycle of the external reciprocating signal, means to repeatedly count each cycle of the multiple frequency during a selected portion of the external reciprocating signal and means to generate a unique address number corresponding to each count thereby providing a stream of unique address numbers, an image memory comprising at least one read only memory and means to provide a stream of imaged unique data numbers in response to the stream of unique address numbers and a stream of image data numbers from the read only memory, means to generate a second set of address numbers from the multiple frequency to allow at least one imaged unique data number to be multiply accessed from image memory during each cycle of the multiple frequency, and one or more output latches wherein the second set of address numbers set the output latches within each cycle of the multiple frequency and the imaged unique data numbers are imposed to form an imaged output from the output latches.

18. The synchronous parallel electronic timing generator of claim 17 including one or more input buffers in communication with the image memory and means in the image memory in response to a change in input to the input buffers to cause a change in the stream of image data numbers from the read only memory.

19. A synchronous parallel electronic timing generator comprising, means to generate a phase tracking multiple frequency from an external reciprocating signal, said multiple frequency being greater than the frequency of the external reciprocating signal and an equal multiple of each cycle of the external reciprocating signal, means to repeatedly count each cycle of the multiple frequency during a selected portion of the external reciprocating signal and means to generate a unique address number corresponding to each count thereby providing a stream of unique address numbers, means to arbitrate between the stream of unique address numbers and a source of image data numbers comprising a central processing unit, said central processing unit providing a stream of image data numbers, an image memory wherein the stream of image data numbers in response to the stream of unique address numbers provides a stream of imaged unique data numbers, means to generate a second set of address numbers from the multiple frequency to allow at least one imaged unique data number to be multiply accessed from image memory during each cycle of the multiple frequency, and one or more output latches wherein the second set of address numbers set the output latches within each cycle of the multiple frequency and the imaged unique data numbers are imposed to form an imaged output from the output latches.

20. The synchronous parallel electronic timing generator of claim 19 wherein the means to arbitrate interleaves the stream of unique address numbers and the stream of image data numbers to the image memory.

21. The synchronous parallel electronic timing generator of claim 19 including means in the central processing unit wherein the image data numbers may be written into and read from the image memory by the central processing unit.

* * * * *